United States Patent
Marinkovic et al.

(10) Patent No.: US 8,180,747 B2
(45) Date of Patent: May 15, 2012

(54) LOAD SHARING CLUSTER FILE SYSTEMS

(75) Inventors: Vladan Z. Marinkovic, Woodland Hills, CA (US); Thomas K. Wong, Pleasanton, CA (US); Saravanan Coimbatore, Sunnyvale, CA (US); Chitra Makkar, Fremont, CA (US); Suma Suresh, Santa Clara, CA (US); Borislav Marinov, Aliso Viejo, CA (US); Ron S. Vogel, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 481 days.

(21) Appl. No.: 12/268,601

(22) Filed: Nov. 11, 2008

(65) Prior Publication Data

US 2009/0210431 A1 Aug. 20, 2009

Related U.S. Application Data

(60) Provisional application No. 60/987,174, filed on Nov. 12, 2007, provisional application No. 60/987,197, filed on Nov. 12, 2007.

(51) Int. Cl.
 *G06F 7/00* (2006.01)
(52) U.S. Cl. ........ 707/704; 707/610; 707/640; 707/821; 718/105; 711/100
(58) Field of Classification Search .................. 707/610, 707/640, 704, 703, 999.001; 718/105; 709/213, 709/214; 711/100
 See application file for complete search history.

(56) References Cited

U.S. PATENT DOCUMENTS

| | | | |
|---|---|---|---|
| 4,993,030 A | 2/1991 | Krakauer et al. |
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |

(Continued)

FOREIGN PATENT DOCUMENTS

AU 2003300350 A1 7/2004
(Continued)

OTHER PUBLICATIONS

"How DFS Works: Remote File Systems", Distributed File System (DFS) Technical Reference, retrieved from the Internet on Feb. 13, 2009: URL:http://technet.microsoft.com/en-us/libary/cc782417.aspx> (2003).

(Continued)

*Primary Examiner* — Dennis Truong
(74) *Attorney, Agent, or Firm* — LeClairRyan

(57) ABSTRACT

Load sharing clusters in which each node is responsible for one or more non-overlapping subset(s) of the cluster namespace and will process only those requests that access file or directory objects in the partitioned namespace that the node controls while redirecting requests designated for other nodes. A non-overlapping subset may be migrated from a source node to a destination node, for example, for load sharing or hotspot mitigation. Migration typically includes maintaining a file virtualization link from the destination node to the source node to permit forwarding of requests by the destination node to the source node during migration of metadata and then migration of data from the source node. After migration is complete, the file virtualization link is broken and the destination node services requests for the non-overlapping subset from the migrated metadata and data.

16 Claims, 14 Drawing Sheets

U.S. PATENT DOCUMENTS

| | | | |
|---|---|---|---|
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,649,194 A | 7/1997 | Miller et al. |
| 5,649,200 A | 7/1997 | Leblang et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,937,406 A | 8/1999 | Balabine et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,223,206 B1 | 4/2001 | Dan et al. |
| 6,233,648 B1 | 5/2001 | Tomita |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,601,101 B1 | 7/2003 | Lee et al. |
| 6,612,490 B1 | 9/2003 | Herrendoerfer et al. |
| 6,721,794 B2 | 4/2004 | Taylor et al. |
| 6,738,790 B1 | 5/2004 | Klein et al. |
| 6,742,035 B1 | 5/2004 | Zayas et al. |
| 6,748,420 B1 | 6/2004 | Quatrano et al. |
| 6,757,706 B1 | 6/2004 | Dong et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,889,249 B2 | 5/2005 | Miloushev et al. |
| 6,922,688 B1 | 7/2005 | Frey, Jr. |
| 6,934,706 B1 | 8/2005 | Mancuso et al. |
| 6,938,039 B1 * | 8/2005 | Bober et al. ............ 707/704 |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,010,553 B2 | 3/2006 | Chen et al. |
| 7,013,379 B1 | 3/2006 | Testardi |
| 7,051,112 B2 | 5/2006 | Dawson |
| 7,072,917 B2 | 7/2006 | Wong et al. |
| 7,089,286 B1 | 8/2006 | Malik |
| 7,111,115 B2 | 9/2006 | Peters et al. |
| 7,113,962 B1 | 9/2006 | Kee et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,146,524 B2 | 12/2006 | Patel et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,599,941 B2 | 10/2009 | Bahar et al. |
| 7,610,307 B2 | 10/2009 | Havewala et al. |
| 7,624,109 B2 | 11/2009 | Testardi |
| 7,639,883 B2 | 12/2009 | Gill |
| 7,653,699 B1 | 1/2010 | Colgrove et al. |
| 7,734,603 B1 | 6/2010 | McManis |
| 7,788,335 B2 | 8/2010 | Miloushev et al. |
| 7,822,939 B1 | 10/2010 | Veprinsky et al. |
| 7,831,639 B1 | 11/2010 | Panchbudhe et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,913,053 B1 | 3/2011 | Newland |
| 7,958,347 B1 | 6/2011 | Ferguson |
| 8,005,953 B2 | 8/2011 | Miloushev et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0147630 A1 | 10/2002 | Rose et al. |

| | | | |
|---|---|---|---|
| 2002/0150253 A1 | 10/2002 | Brezak et al. | |
| 2002/0161911 A1 | 10/2002 | Pinckney, III et al. | |
| 2002/0188667 A1 | 12/2002 | Kirnos | |
| 2003/0009429 A1 | 1/2003 | Jameson | |
| 2003/0028514 A1 | 2/2003 | Lord et al. | |
| 2003/0033308 A1 | 2/2003 | Patel et al. | |
| 2003/0033535 A1 | 2/2003 | Fisher et al. | |
| 2003/0061240 A1 | 3/2003 | McCann et al. | |
| 2003/0115218 A1* | 6/2003 | Bobbitt et al. | 707/200 |
| 2003/0115439 A1* | 6/2003 | Mahalingam et al. | 712/1 |
| 2003/0135514 A1 | 7/2003 | Patel et al. | |
| 2003/0149781 A1 | 8/2003 | Yared et al. | |
| 2003/0159072 A1 | 8/2003 | Bellinger et al. | |
| 2003/0171978 A1 | 9/2003 | Jenkins et al. | |
| 2003/0177388 A1 | 9/2003 | Botz et al. | |
| 2003/0204635 A1 | 10/2003 | Ko et al. | |
| 2004/0003266 A1 | 1/2004 | Moshir et al. | |
| 2004/0006575 A1 | 1/2004 | Visharam et al. | |
| 2004/0010654 A1 | 1/2004 | Yasuda et al. | |
| 2004/0025013 A1 | 2/2004 | Parker et al. | |
| 2004/0028043 A1 | 2/2004 | Maveli et al. | |
| 2004/0028063 A1 | 2/2004 | Roy et al. | |
| 2004/0030857 A1 | 2/2004 | Krakirian et al. | |
| 2004/0054777 A1 | 3/2004 | Ackaouy et al. | |
| 2004/0098383 A1 | 5/2004 | Tabellion et al. | |
| 2004/0133573 A1 | 7/2004 | Miloushev et al. | |
| 2004/0133577 A1 | 7/2004 | Miloushev et al. | |
| 2004/0133606 A1 | 7/2004 | Miloushev et al. | |
| 2004/0133607 A1 | 7/2004 | Miloushev et al. | |
| 2004/0133650 A1 | 7/2004 | Miloushev et al. | |
| 2004/0139355 A1 | 7/2004 | Axel et al. | |
| 2004/0148380 A1 | 7/2004 | Meyer et al. | |
| 2004/0153479 A1* | 8/2004 | Mikesell et al. | 707/200 |
| 2004/0181605 A1 | 9/2004 | Nakatani et al. | |
| 2004/0236798 A1 | 11/2004 | Srinivasan et al. | |
| 2004/0267830 A1* | 12/2004 | Wong et al. | 707/200 |
| 2005/0021615 A1 | 1/2005 | Arnott et al. | |
| 2005/0050107 A1 | 3/2005 | Mane et al. | |
| 2005/0091214 A1 | 4/2005 | Probert et al. | |
| 2005/0108575 A1 | 5/2005 | Yung | |
| 2005/0114291 A1 | 5/2005 | Becker-Szendy et al. | |
| 2005/0187866 A1 | 8/2005 | Lee | |
| 2005/0246393 A1 | 11/2005 | Coates et al. | |
| 2005/0289109 A1 | 12/2005 | Arrouye et al. | |
| 2005/0289111 A1 | 12/2005 | Tribble et al. | |
| 2006/0075475 A1 | 4/2006 | Boulos et al. | |
| 2006/0080353 A1 | 4/2006 | Miloushev et al. | |
| 2006/0106882 A1 | 5/2006 | Douceur et al. | |
| 2006/0112151 A1 | 5/2006 | Manley et al. | |
| 2006/0123062 A1 | 6/2006 | Bobbitt et al. | |
| 2006/0161518 A1 | 7/2006 | Lacapra | |
| 2006/0167838 A1 | 7/2006 | Lacapra | |
| 2006/0184589 A1 | 8/2006 | Lees et al. | |
| 2006/0190496 A1 | 8/2006 | Tsunoda | |
| 2006/0200470 A1 | 9/2006 | Lacapra et al. | |
| 2006/0212746 A1* | 9/2006 | Amegadzie et al. | 714/6 |
| 2006/0224687 A1 | 10/2006 | Popkin et al. | |
| 2006/0230265 A1 | 10/2006 | Krishna | |
| 2006/0259949 A1 | 11/2006 | Schaefer et al. | |
| 2006/0271598 A1 | 11/2006 | Wong et al. | |
| 2006/0277225 A1 | 12/2006 | Mark et al. | |
| 2007/0022121 A1* | 1/2007 | Bahar et al. | 707/10 |
| 2007/0024919 A1 | 2/2007 | Wong et al. | |
| 2007/0027929 A1 | 2/2007 | Whelan | |
| 2007/0028068 A1 | 2/2007 | Golding et al. | |
| 2007/0088702 A1 | 4/2007 | Fridella et al. | |
| 2007/0098284 A1 | 5/2007 | Sasaki et al. | |
| 2007/0136308 A1 | 6/2007 | Tsirigotis et al. | |
| 2007/0208748 A1 | 9/2007 | Li | |
| 2007/0209075 A1 | 9/2007 | Coffman | |
| 2007/0226331 A1* | 9/2007 | Srinivasan et al. | 709/223 |
| 2008/0070575 A1 | 3/2008 | Claussen et al. | |
| 2008/0104443 A1 | 5/2008 | Akutsu et al. | |
| 2008/0209073 A1 | 8/2008 | Tang | |
| 2008/0222223 A1* | 9/2008 | Srinivasan et al. | 707/205 |
| 2008/0243769 A1 | 10/2008 | Arbour et al. | |
| 2008/0282047 A1 | 11/2008 | Arakawa et al. | |
| 2009/0007162 A1 | 1/2009 | Sheehan | |
| 2009/0041230 A1 | 2/2009 | Williams | |
| 2009/0077097 A1 | 3/2009 | Lacapra et al. | |
| 2009/0094252 A1 | 4/2009 | Wong et al. | |
| 2009/0106255 A1 | 4/2009 | Lacapra et al. | |
| 2009/0106263 A1 | 4/2009 | Khalid et al. | |
| 2009/0132616 A1 | 5/2009 | Winter et al. | |
| 2009/0204649 A1 | 8/2009 | Wong et al. | |
| 2009/0204650 A1 | 8/2009 | Wong et al. | |
| 2009/0204705 A1 | 8/2009 | Marinov et al. | |
| 2009/0210431 A1 | 8/2009 | Marinkovic et al. | |
| 2009/0254592 A1 | 10/2009 | Marinov et al. | |

FOREIGN PATENT DOCUMENTS

| | | |
|---|---|---|
| CA | 2512312 A1 | 7/2004 |
| EP | 0 738 970 A1 | 10/1996 |
| JP | 63010250 A | 1/1988 |
| JP | 06-332782 | 12/1994 |
| JP | 08-328760 | 12/1996 |
| JP | 08-339355 | 12/1996 |
| JP | 9016510 A | 1/1997 |
| JP | 11282741 A1 | 10/1999 |
| WO | WO 02/056181 A2 | 7/2002 |
| WO | WO 2004/061605 A2 | 7/2004 |
| WO | WO 2008/130983 A1 | 10/2008 |
| WO | WO 2008/147973 A2 | 12/2008 |

OTHER PUBLICATIONS

International Search Report for International Patent Application No. PCT/US2008/083117 (May 22, 2009).

"The AFS File System in Distributed Computing Environment", www.transarc.ibm.com/Library/whitepapers/AFS/afsoverview. html, last accessed on Dec. 20, 2002.

Aguilera, Marcos K. et al., "Improving recoverability in multi-tier storage systems", International Conference on Dependable Systems and Networks (DSN-2007), Edinburgh, Scotland, Jun. 2007, 10 pages.

Anderson, Darrell C. et al., "Interposed Request Routing for Scalable Network Storage", ACM Transactions on Computer Systems 20(1): (Feb. 2002), pp. 1-24.

Anderson et al., "Serverless Network File System", in the 15th Symposium on Operating Systems Principles, Dec. 1995, Association for Computing Machinery, Inc.

Apple, Inc., "Mac OS X Tiger Keynote Intro. Part 2", Jun. 2004, www.youtube.com <http://www.youtube.com/watch?v=zSBJwEmRJbY>, p. 1.

Apple, Inc., "Tiger Developer Overview Series: Working with Spotlight", Nov. 23, 2004, www.apple.com using www.archive.org <http ://web.archive.org/web/20041123005335/developer.apple. com/macosx/tiger/spotlight.html>, pp. 1-6.

"Auspex Storage Architecture Guide", Second Edition, 2001, Auspex Systems, Inc., www.auspex.com, last accessed on Dec. 30, 2002.

Cabrera et al., "Swift: Storage Architecture for Large Objects", In Proceedings of the-Eleventh IEEE Symposium on Mass Storage Systems, pp. 123-128, Oct. 1991.

Cabrera et al., "Swift: Using Distributed Disk Striping to Provide High I/O Data Rates", Computing Systems 4, 4 (Fall 1991), pp. 405-436.

Cabrera et al., "Using Data Striping in a Local Area Network", 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters", in Proceedings of the Extreme Linux Track: 4th Annual Linux Showcase and Conference, pp. 317-327, Atlanta, Georgia, Oct. 2000, USENIX Association.

Cavale, M. R., "Introducing Microsoft Cluster Service (MSCS) in the Windows Server 2003", Microsoft Corporation, Nov. 2002.

"CSA Persistent File System Technology", Colorado Software Architecture, Inc.: A White Paper, Jan. 1, 1999, p. 1-3, <http://www.cosoa.com/white_papers/pfs.php>.

"Distributed File System: Logical View of Physical Storage: White Paper", 1999, Microsoft Corp., www.microsoft.com, <http://www.

eu.microsoft.com/TechNet/prodtechnol/windows2000serv/maintain/DFSnt95>, pp. 1-26, last accessed on Dec. 20, 2002.

English Language Abstract of JP 08-328760 from Patent Abstracts of Japan.

English Language Abstract of JP 08-339355 from Patent Abstracts of Japan.

English Translation of paragraphs 17, 32, and 40-52 of JP 08-328760.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks", Jan. 2000, McGraw Hill, ISBN 0072120509.

Gibson et al., "File Server Scaling with Network-Attached Secure Disks", in Proceedings of the ACM International Conference on Measurement and Modeling of Computer Systems (Sigmetrics '97), Jun. 15-18, 1997, Association for Computing Machinery, Inc.

Gibson et al., "NASD Scalable Storage Systems", Jun. 1999, USENIX99, Extreme Linux Workshop, Monterey, California.

Harrison, C., Copy of May 19, 2008 response to Communication pursuant to Article 96(2) EPC dated Nov. 9, 2007 in corresponding European patent application No. 02718824.2.

Hartman, J., "The Zebra Striped Network File System", 1994, Ph.D. dissertation submitted in the Graduate Division of the University of California at Berkeley.

Haskin et al., "The Tiger Shark File System", 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space", IEEE Concurrency, pp. 60-69, Jan.-Mar. 1999.

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT /US02/00720, Jul. 8, 2004.

International Search Report from International Application No. PCT/US03/41202, mailed Sep. 15, 2005.

Karamanolis, C. et al., "An Architecture for Scalable and Manageable File Services", HPL-2001-173, Jul. 26, 2001. p. 1-114.

Katsurashima, W. et al., "NAS Switch: A Novel CIFS Server Virtualization, Proceedings", 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers", 13Th LISA Conf., 1999, pp. 275-282 of the Proceedings.

Klayman, J., Copy of Nov. 13, 2008 e-mail to Japanese associate including instructions for response to office action dated May 26, 2008 in corresponding Japanese patent application No. 2002-556371.

Klayman, J., response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)", RFC 1510, Sep. 1993. (http://www.ietf.org/rfc/rfc1510.txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects", Feb. 25, 2011, last accessed Mar. 17, 2011, <http ://searchstorage.techtarget.com/news/article/0,289142, sid5__gci1527986,00.html>.

Long et al., "Swift/RAID: A distributed RAID System", Computing Systems, vol. 7, pp. 333-359, Summer 1994.

"NERSC Tutorials: I/O on the Cray T3E, 'Chapter 8, Disk Striping'", National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'", Proceedings of the Computing, Las Vegas, NV, Jun. 2000, pp. 1-6 on the Internet: Intl Conf on Internet.

Norton et al., "CIFS Protocol Version CIFS-Spec 0.9", 2001, Storage Networking Industry Association (SNIA), www.snia.org, last accessed on Mar. 26, 2001.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings", Comm. of the ACM, vol. 33, No. 6, Jun. 1990.

Peterson, M., "Introducing Storage Area Networks", Feb 1998, InfoStor, www.infostor.com, last accessed on Dec. 20, 2002.

Preslan et al., "Scalability and Failure Recovery in a Linux Cluster File System", in Proceedings of the 4th Annual Linux Showcase & Conference, Atlanta, Georgia, Oct. 10-14,2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21,2007 for relatedU.S. Appl. No. 10/336,784.

Rodriguez et al., "Parallel-access for mirror sites in the Internet", InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0/7803-5880-5 p. 867, col. 2, last paragraph -p. 868, col. 1, paragraph 1.

RSYNC, "Welcome to the RSYNC Web Pages", Retrieved from the Internet URL: http://samba.anu.edu.ut.rsync/. (Retrieved on Dec. 18, 2009).

Savage, et al., "Afraid-A Frequently Redundant Array of Independent Disks", 1996 USENIX Technical Conf., San Diego, California, Jan. 22-26, 1996.

"Scaling Next Generation Web Infrastructure with Content-Intelligent Switching: White Paper", Apr. 2000, p. 1-9 Alteon Web Systems, Inc.

Soltis et al., "The Design and Performance of a Shared Disk File System for IRIX", in Sixth NASA Goddard Space Flight Center Conference on Mass Storage and Technologies in cooperation with the Fifteenth IEEE Symposium on Mass Storage Systems, Mar. 23-26, 1998.

Soltis et al., "The Global File System", in Proceedings of the Fifth NASA Goddard Space Flight Center Conference on Mass Storage Systems and Technologies, Sep. 17-19, 1996, College Park, Maryland.

Sorenson, K.M., "Installation and Administration: Kimberlite Cluster Version 1.1.0, Rev. Dec. 2000", Mission Critical Linux, http://oss.missioncriticallinux.corn/kimberlite/kimberlite.pdf.

Stakutis, C., "Benefits of SAN-based file system sharing", Jul. 2000, InfoStor, www.infostor.com, last accessed on Dec. 30, 2002.

Thekkath et al., "Frangipani: A Scalable Distributed File System", in Proceedings of the 16th ACM Symposium on Operating Systems Principles, Oct. 1997, Association for Computing Machinery, Inc.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"Veritas SANPoint Foundation Suite(tm) and SANPoint Foundation Suite(tm) HA: New VERITAS Volume Management and File System Technology for Cluster Environments", Sep. 2001, VERITAS Software Corp.

Wilkes, J., et al., "The HP AutoRAID Hierarchical Storage System", ACM Transactions on Computer Systems, vol. 14, No. 1, Feb. 1996.

"Windows Clustering Technologies-An Overview", Nov. 2001, Microsoft Corp., www.microsoft.com, last accessed on Dec. 30, 2002.

Zayas, E., "AFS-3 Programmer's Reference: Architectural Overview", Transarc Corp., version 1.0 of Sep. 2, 1991.

Basney et al., "Credential Wallets: A Classification of Credential Repositories Highlighting MyProxy," TPRC 2003, Sep. 19-21, 2003.

Botzum, Keys, "Single Sign On—A Contrarian View," Open Group Website, <http://www.opengroup.org/security/topics.htm>, Aug. 6, 2001, pp. 1-8.

Novotny et al., "An Online Credential Repository for the Grid: MyProxy," 2001, pp. 1-8.

Pashalidis et al., "A Taxonomy of Single Sign-On Systems," 2003, pgs. 1-16, Royal Holloway, University of London, Egham Surray, TW20, 0EX, United Kingdom.

Pashalidis et al., "Impostor: a Single Sign-On System for Use from Untrusted Devices," Global Telecommunications Conference, 2004, GLOBECOM '04, IEEE, Issue Date: Nov. 29,-Dec. 3, 2004.Royal Holloway, University of London.

Tulloch, Mitch, "Microsoft Encyclopedia of Security," 2003, pp. 218, 300-301, Microsoft Press, Redmond, Washington.

* cited by examiner

LOAD SHARING CLUSTER FILE SYSTEMS

CROSS-REFERENCE TO RELATED APPLICATIONS

This application claims priority from the U.S. Provisional Patent Application No. 60/987,174 entitled LOAD SHARING CLUSTER FILE SYSTEM filed Nov. 12, 2007 and also claims priority from U.S. Provisional Patent Application No. 60/987,197 entitled HOTSPOT MITIGATION IN LOAD SHARING CLUSTER FILE SYSTEMS filed Nov. 12, 2007.

This patent application also may be related to one or more of the following patent applications:

U.S. Provisional Patent Application No. 60/923,765 entitled NETWORK FILE MANAGEMENT SYSTEMS, APPARATUS, AND METHODS filed on Apr. 16, 2007.

U.S. Provisional Patent Application No. 60/940,104 entitled REMOTE FILE VIRTUALIZATION filed on May 25, 2007.

U.S. Provisional Patent Application No. 60/987,161 entitled REMOTE FILE VIRTUALIZATION METADATA MIRRORING filed Nov. 12, 2007.

U.S. Provisional Patent Application No. 60/987,165 entitled REMOTE FILE VIRTUALIZATION DATA MIRRORING filed Nov. 12, 2007.

U.S. Provisional Patent Application No. 60/987,170 entitled REMOTE FILE VIRTUALIZATION WITH NO EDGE SERVERS filed Nov. 12, 2007.

U.S. Provisional Patent Application No. 60/987,206 entitled NON-DISRUPTIVE FILE MIGRATION filed Nov. 12, 2007.

U.S. Provisional Patent Application No. 60/987,194 entitled ON DEMAND FILE VIRTUALIZATION FOR SERVER CONFIGURATION MANAGEMENT WITH LIMITED INTERRUPTION filed Nov. 12, 2007.

U.S. Provisional Patent Application No. 60/987,181 entitled FILE DEDUPLICATION USING STORAGE TIERS filed Nov. 12, 2007.

U.S. patent application Ser. No. 12/104,197 entitled FILE AGGREGATION IN A SWITCHED FILE SYSTEM filed Apr. 16, 2008.

U.S. patent application Ser. No. 12/103,989 entitled FILE AGGREGATION IN A SWITCHED FILE SYSTEM filed Apr. 16, 2008.

U.S. patent application Ser. No. 12/126,129 entitled REMOTE FILE VIRTUALIZATION IN A SWITCHED FILE SYSTEM filed May 23, 2008.

All of the above-referenced patent applications are hereby incorporated herein by reference in their entireties.

FIELD OF THE INVENTION

This invention relates generally to clustered file systems, and relates more particularly to load sharing cluster file systems including non-disruptive data migration and hotspot mitigation based on file virtualization and DFS redirection.

BACKGROUND OF THE INVENTION

In a "load balancing" cluster file system, different nodes in the cluster access the same portion or the entirety of the shared file system. Clients of the file system are either randomly connected to a node, or a group of clients are designated to connect to a specific node. Each node may receive a different load of client requests for file services. If a node is experiencing more requests than other nodes, the node may forward the request to a node with a lower load. Ideally, each node should get similar number of file requests from clients.

Because any node participating in the cluster can contain the authoritative state on any given file system object, every node can be a synchronization point for a file. Since two or more nodes may access the same file at the same time, complex distributed concurrency algorithms are needed to resolve any access conflict. These algorithms are hard to write and take years to become fully reliable to function properly in a production environment.

The GPFS file system developed by IBM is an example of a Load Balancing Cluster File System.

In a "load sharing" cluster file system, each cluster node is responsible for serving one or more non-overlapping portions of the cluster file system namespace. If a node receives client requests for data outside the scope of the namespace it is serving, it may forward the request to the node that does service the requested region of the namespace.

Since the server nodes do not share overlapped regions of the file system, only a single server will contain the authoritative state of the portion of the file system it serves, a single synchronization point exists. This removes the need for implementing complex distributed concurrency algorithms.

Load sharing cluster file systems generally provide such things as:

1) High Availability and Redundancy: Because the file system is configured within a cluster, cluster protection and availability are extended to the file system.

2) Reduced complexity: Since each node has exclusive ownership of the filesystem it servers, implementing a load sharing cluster filesystem becomes much simpler compared to a load balancing cluster file system where complex concurrency algorithms are needed for arbitration of shared access by each node to the complete file system.

3) Increased Performance and Capacity: With the partitioning of the filesystem, additional nodes can contribute to the serving of the filesystem thus allowing higher total cluster capacity to serve the clients as well as improved performance under high load. Ability to partition namespace based on need: Allows end users to hierarchically structure data to match the representation of their business needs.

4) Pay as you go horizontal scaling: Namespace partitioning allows capacity and performance to expanded as there is need and in the area where the need is greatest, rather than globally in the cluster.

5) Enable real-time reconfiguration of the namespace: Unlike technologies like DFS where there is no ability to transparently reconfigure the namespace or contact all clients using the namespace, Load Sharing Cluster File Systems maintain statefull information about all connections and are able to provide seamless namespace reconfiguration via server side File Virtualization technology, solving one of the biggest deployment hurdles for technologies like DFS.

Since clients do not know how the cluster namespace is partitioned among the nodes of a cluster file system, the node that exports the entire namespace of the cluster file system will bear the full burden and will get all of the request traffic for the cluster file system. That node must then direct each request to the node that is responsible for the partitioned namespace. This extra hop adds additional latency and introduces a scalability problem. Furthermore, the workload of a Load Sharing Cluster is distributed among the nodes based on how the cluster namespace is partitioned. Certain namespaces may experience more workload than others, creating hotspots in the cluster file system. However, since only one node, the node that owns the partitioned namespace, is allowed to service requests for the partitioned namespace that it is responsible for; other nodes with low workload are not capable of helping nodes that are busy. Finally, reconfiguring the partitioned namespaces among the node usually involves moving data or metadata from one node to another and this data movement is very disruptive. Thus, while it is desirable to provide a load sharing cluster file system, these problems must be resolved first before a Load Sharing Cluster File System becomes practical.

Microsoft DFS allows administrators to create a virtual folder consisting of a group of shared folders located on different servers by transparently connecting them to one or more DFS namespaces. A DFS namespace is a virtual view of shared folders in an organization. Each virtual folder in a DFS namespace may be a DFS link that specifies a file server that is responsible for the namespace identified by the virtual folder, or it may be another virtual folder containing other DFS links and virtual folders. Under DFS, a file server that exports shared folders may be a member of many DFS namespaces. Each server in a DFS namespace is not aware that the file server is a member of a DFS namespace. In essence, DFS creates a loosely coupled distributed file system consisting of one or more file servers that operate independently of each other in the namespace.

DFS uses a client-side name resolution scheme to locate the file server that is destined to process file request for a virtual folder in a DFS namespace. The server that exports the DFS namespace in a root virtual folder, the DFS root server, will receive all the name resolution request traffic destined for the virtual folder.

The clients of a DFS namespace will ask the DFS root server who is the target file server and the shared folder in the file server that corresponds to a DFS virtual folder. Upon receiving the information, the DFS clients is responsible to redirect file requests to the target file server and a new path name constructed from the information obtained from the DFS root server. To reduce the load of the DFS root server, the DFS root server does not keep track of who are the clients of the exported DFS namespace. To further reduce the load, clients keep a cache of the association of a virtual folder and its target server and the actual pathname in the target server. Once the client processes the client-side resolution and connects to the target file server, the DFS server no longer participates in the network IO. Furthermore, if a name is in the client side DFS cache, the client will not contact the DFS root server again for the same name until the cache is stale, usually for about 15 minutes. This methodology allows DFS great efficiency and optimal performance since the client is rapidly connected directly to the target file server.

Due to the client-side nature of the protocol and the fact that a connection is not maintained from the client to the DFS server, configuration changes in the DFS namespace cannot be propagated to the clients, especially since DFS does not maintain a client list. Further complicating the problem, each client also uses a client-side DFS name cache and it will not obtain the up-to-date file location information from the server unless the cache is stale. Therefore, maintaining configuration inconsistency is a big challenge. If configuration consistency is not maintained, even for a small duration, may lead to data corruption. Thus for DFS to become a viable cluster solution, configuration consistency must be maintained at all time.

Generally speaking, "file virtualization" is a method for a computer node to proxy client filesystem requests to a secondary storage server that has been virtually represented in the local portion of the file system namespace as a mounted folder.

A traditional file system manages the storage space by providing a hierarchical namespace. The hierarchical namespace starts from the root directory, which contains files and subdirectories. Each directory may also contain files and subdirectories identifying other files or subdirectories. Data is stored in files. Every file and directory is identified by a name. The full name of a file or directory is constructed by concatenating the name of the root directory and the names of each subdirectory that finally leads to the subdirectory containing the identified file or directory, together with the name of the file or the directory.

The full name of a file thus carries with it two pieces of information: (1) the identification of the file and (2) the physical storage location where the file is stored. If the physical storage location of a file is changed (for example, moved from one partition mounted on a system to another), the identification of the file changes as well.

For ease of management, as well as for a variety of other reasons, the administrator would like to control the physical storage location of a file. For example, important files might be stored on expensive, high-performance file servers, while less important files could be stored on less expensive and less capable file servers.

Unfortunately, moving files from one server to another usually changes the full name of the files and thus, their identification, as well. This is usually a very disruptive process, since after the move users may not be able to remember the new location of their files. Thus, it is desirable to separate the physical storage location of a file from its identification. With this separation, IT and system administrators will be able to control the physical storage location of a file while preserving what the user perceives as the location of the file (and thus its identity).

File virtualization is a technology that separates the full name of a file from its physical storage location. File virtualization is usually implemented as a hardware appliance that is located in the data path between users and the file servers. For users, a file virtualization appliance appears as a file server that exports the namespace of a file system. From the file servers' perspective, the file virtualization appliance appears as just a normal user. Attune System's Maestro File Manager (MFM) is an example of a file virtualization appliance. FIG. 1 is a schematic diagram showing an exemplary switched file system including a file switch (MFM).

As a result of separating the full name of a file from the file's physical storage location, file virtualization provides the following capabilities:

1) Creation of a synthetic namespace

Once a file is virtualized, the full filename does not provide any information about where the file is actually stored. This leads to the creation of synthetic directories where the files in a single synthetic directory may be stored on different file servers. A synthetic namespace can also be created where the directories in the synthetic namespace may contain files or directories from a number of different file servers. Thus, file virtualization allows the creation of a single global namespace from a number of cooperating file servers. The synthetic namespace is not restricted to be from one file server, or one file system.

2) Allows having many full filenames to refer to a single file

As a consequence of separating a file's name from the file's storage location, file virtualization also allows multiple full filenames to refer to a single file. This is important as it allows existing users to use the old filename while allowing new users to use a new name to access the same file.

3) Allows having one full name to refer to many files

Another consequence of separating a file's name from the file's storage location is that one filename may refer to many files. Files that are identified by a single filename need not contain identical contents. If the files do contain identical contents, then one file is usually designated as the authoritative copy, while the other copies are called the mirror copies. Mirror copies increase the availability of the authoritative copy, since even if the file server containing the authoritative copy of a file is down, one of the mirror copies may be designated as a new authoritative copy and normal file access can then resumed. On the other hand, the contents of a file identified by a single name may change according to the identity of the user who wants to access the file.

Cluster file systems may be used to meet strong growth of end user unstructured data needs. Load sharing cluster file system is generally simpler to implement than load balancing cluster file system. Furthermore, a cluster file system that uses partitioned namespace to divide workload among the nodes in a cluster is a better match for the business environment. This is because each organization in a business environment usually has its own designated namespace. For example, engineering department may own the namespace /global/engineering, while the marketing department owns/global/marketing namespace. If engineering needs more resources, engineering namespace may be further partitioned and more nodes are added for engineering, without affecting the marketing department.

DFS is good match for a load sharing namespace. Unfortunately, it is hard to maintain configuration consistency among all clients. It also is not a true cluster and does not provide protection from failure.

SUMMARY OF THE INVENTION

Embodiments of the present invention relate generally to load sharing clusters in which each node is responsible for one or more non-overlapping subset(s) of the cluster namespace and will process only those requests that access file or directory objects in the partitioned namespace that the node controls while redirecting requests designated for other nodes. Specific embodiments of the present invention are based on using DFS in conjunction with File Virtualization to overcome DFS configuration consistency deficiency as well as to provide cluster protection and availability. Exemplary embodiments use DFS to enable clients to communicate directly with the node in the load sharing cluster that is destined to process the request according to the partitioned namespace that the request is for. Once the namespace for the node is resolved, DFS is essentially out of the picture. DFS resolution is essentially used as a hint. If the DFS configuration is changed and a node receives a request not destined for the node, the node will forward the request to the correct owner, thus overcoming the DFS configuration consistency problem.

In accordance with one embodiment of the present invention there is provides a method for load sharing in an aggregated file system having a cluster of file storage nodes and a distributed filesystem server (DFS) node, the file storage nodes collectively maintaining a shared storage including a plurality of non-overlapping portions, each file storage node owning at least one of the non-overlapping portions and including for each non-overlapping portion not owned by the file storage node a file virtualization link identifying another file storage node for the non-overlapping portion, the DFS node mapping each non-overlapping portion to a file storage node. The method involves generating client requests by a number of client nodes, each client request identifying a non-overlapping portion and directed to a specific file storage node based on an access to the DFS server or information in a client cache; and for each client request received by a file storage node, servicing the client request by the receiving file storage node if the receiving file storage node owns the identified non-overlapping portion and otherwise forwarding the client request by the receiving file storage node to another file storage node identified using the file virtualization links.

In various alternative embodiments, the method may further involve migrating a specified non-overlapping portion from a source file storage node to a destination file server node, for example, due to reconfiguration of the cluster of based on loading of the source file storage node. Migrating the specified non-overlapping portion may involve establishing a file virtualization link on the destination file server node, the file virtualization link identifying the file storage node that owns the non-overlapping portion; updating the cluster resource to map the non-overlapping portion to the destination file storage node; building metadata for the non-overlapping portion on the destination file storage node using sparse files such that all file and directory attributes of the non-overlapping portion are replicated on the destination file storage node without any data, and during such building, forwarding client requests received for the non-overlapping portion by the destination file storage node to the file storage node that owns the non-overlapping portion based on the file virtualization link; after building the metadata for the non-overlapping portion on the destination file storage, copying data for the non-overlapping portion from the source file storage node to the destination file storage node, and during such copying, servicing metadata requests received for the non-overlapping portion by the destination file storage node using the metadata and forwarding data requests received for the non-overlapping portion by the destination file storage node to the file storage node that owns the non-overlapping portion based on the file virtualization link; and after completion of the copying, designating the destination file storage node as the owner of the non-overlapping portion and thereafter servicing client requests received for the non-overlapping portion by the destination file storage node. The destination file storage node may be an existing file storage node in the cluster or may be a new file storage node added to the cluster.

In accordance with another embodiment of the present invention there is provided a method for load sharing by a file storage node in an aggregated file system having a plurality of file storage nodes and a distributed filesystem server (DFS) node, the file storage nodes collectively maintaining a shared storage including a plurality of non-overlapping portions, each file storage node owning at least one of the non-overlapping portions and including for each non-overlapping portion not owned by the file storage node a file virtualization link identifying another file storage node for the non-overlapping portion, the DFS node mapping each non-overlapping portion to a file storage node. The method involves receiving, by the file storage node, a client request identifying a non-overlapping portion; when the file storage node owns the identified non-overlapping portion, servicing the client request by the file storage node; and when the file storage node does not own the identified non-overlapping portion, forwarding the client request by the file storage node to another file storage node identified using the file virtualization links In various alternative embodiments, the method may further involve migrating a specified non-overlapping portion from another file storage node. Migrating the specified non-overlapping portion may involve maintaining a file virtualization link to the specified non-overlapping portion on the other file storage node; migrating metadata for the specified non-overlapping portion from the other file storage node; after migrating the metadata, migrating data for the specified non-overlapping portion from the other file storage node; and after migrating the data, breaking the file virtualization link. While migrating the metadata, the file storage node typically redirects requests for the specified non-overlapping portion to the other file storage node. While migrating the data, the file storage node typically services metadata requests for the specified non-overlapping portion from the migrated metadata and forwards data request for the specified non-overlapping portion to the other file storage node. After breaking the file virtualization link, the file storage node typically services requests for the specified non-overlapping portion from the migrated metadata and data. Migrating may be done for at least one of load sharing and hotspot mitigation.

In accordance with another embodiment of the present invention there is provided a file storage node for use in an aggregated filesystem having a plurality of file storage nodes and a cluster resource, the file storage nodes collectively maintaining a shared storage including a plurality of non-overlapping portions, each file storage node owning at least one of the non-overlapping portions and including for each non-overlapping portion owned by another file storage node a file virtualization link identifying the other file storage node, the cluster resource including for each non-overlapping portion a link mapping the non-overlapping portion to a target file storage node. The file storage node includes a network interface for receiving a client request identifying a non-overlapping portion; and a processor configured to service the client request if the file storage node owns the identified non-overlapping portion and to forward the client request to another file storage node identified using the file virtualization links if the file storage node does not own the identified non-overlapping portion.

In various alternative embodiments, the processor may be further configured to migrate a specified non-overlapping portion from another file storage node. Migrating the specified non-overlapping portion may involve maintaining a file virtualization link to the specified non-overlapping portion on the other file storage node; migrating metadata for the specified non-overlapping portion from the other file storage node; after migrating the metadata, migrating data for the specified non-overlapping portion from the other file storage node; and after migrating the data, breaking the file virtualization link. While migrating the metadata, the file storage node typically redirects requests for the specified non-overlapping portion to the other file storage node. While migrating the data, the file storage node typically services metadata requests for the specified non-overlapping portion from the migrated metadata and forwards data request for the specified non-overlapping portion to the other file storage node. After breaking the file virtualization link, the file storage node typically services requests for the specified non-overlapping portion from the migrated metadata and data. Migrating may be done for at least one of load sharing and hotspot mitigation.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires.

A "cluster" is a group of networked computer servers that all work together to provide high performance services to their client computers.

A "node," "computer node" or "cluster node" is a server computer system that is participating in providing cluster services within a cluster.

A "cluster file system" is a distributed file system that is not a single server with a set of clients, but instead a cluster of servers that all work together to provide high performance file services to their clients. To the clients, the cluster is transparent—it is just "the file system", but the file system software deals with distributing requests to elements of the storage cluster.

An "active-active file system cluster" is a group of network connected computers in which each computer (node) participates in serving a cluster file system.

Embodiments of the present invention relate generally to load sharing clusters in which each node is responsible for one or more non-overlapping subset(s) of the cluster namespace and will process only those requests that access file or directory objects in the partitioned namespace that the node controls while redirecting requests designated for other nodes. Specific embodiments of the present invention are based on using DFS in conjunction with File Virtualization to overcome DFS configuration consistency deficiency as well as to provide cluster protection and availability. Exemplary embodiments use DFS to enable clients to communicate directly with the node in the load sharing cluster that is destined to process the request according to the partitioned namespace that the request is for. Once the namespace for the node is resolved, DFS is essentially out of the picture. DFS resolution is essentially used as a hint. If the DFS configuration is changed and a node receives a request not destined for the node, the node will forward the request to the correct owner, thus overcoming the DFS configuration consistency problem.

Figure 1:
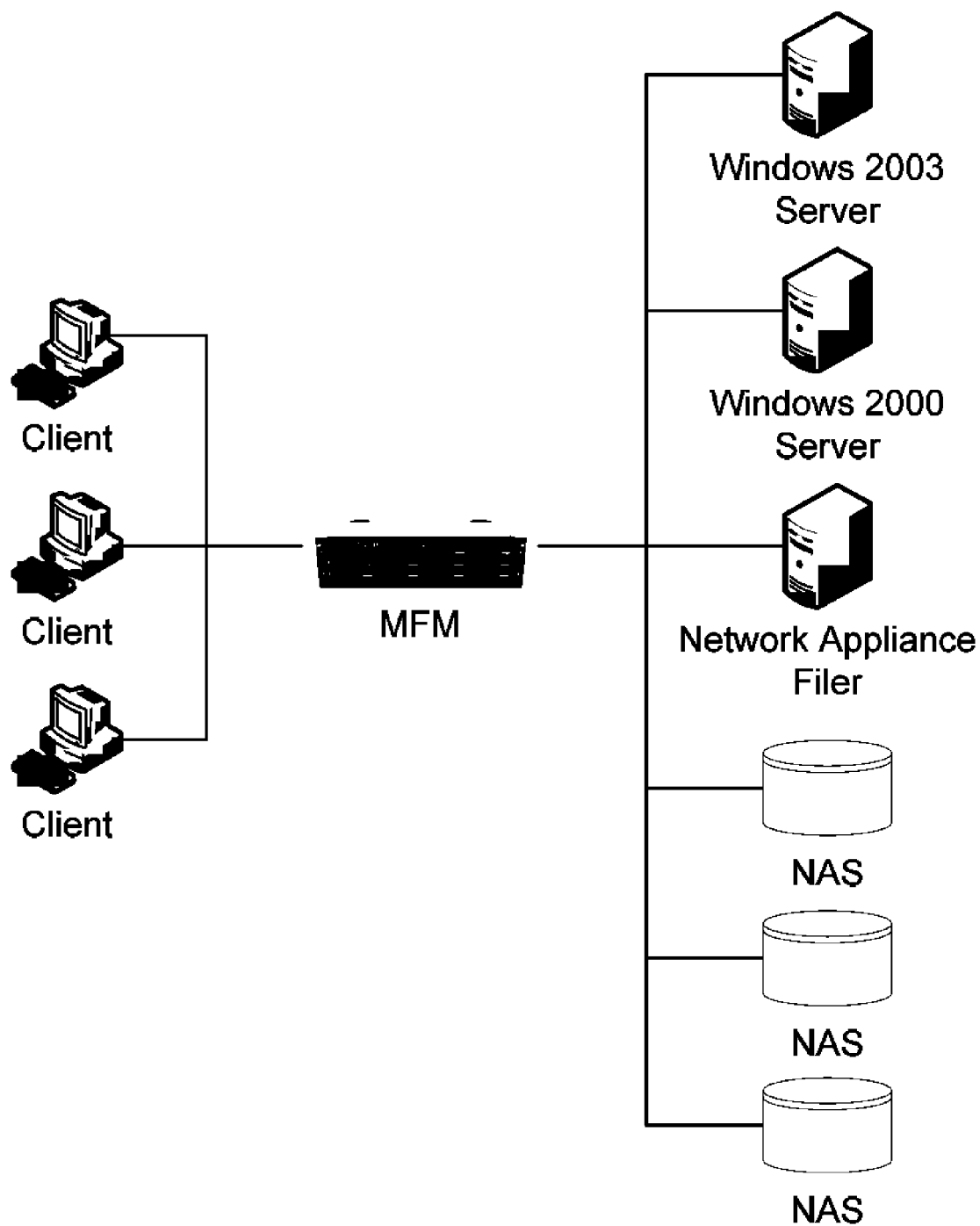
FIG. 1 is a schematic diagram showing an exemplary switched file system including a file switch (MFM) as known in the art.
Figure 2:
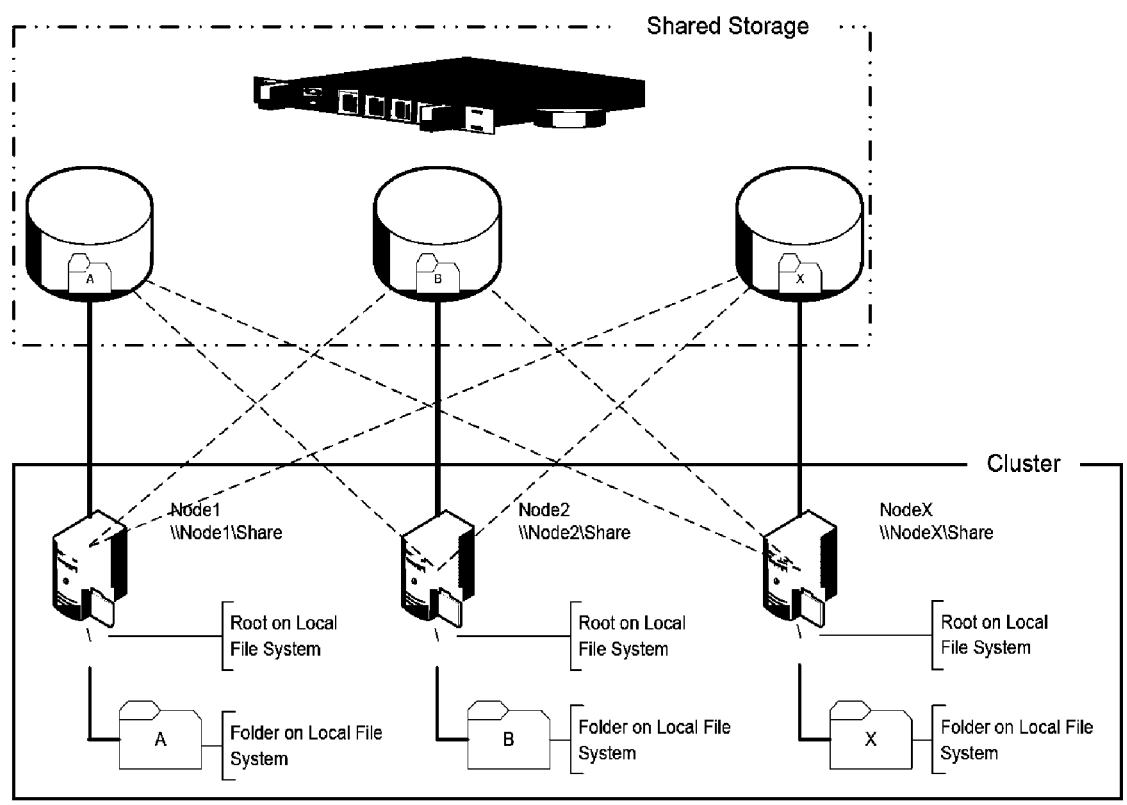
FIG. 2 is a schematic diagram showing a cluster with shared storage as known in the art.

In a standard shared storage cluster system, each computer node participating in the cluster is the owner of one or more non-overlapped regions of the shared storage. The storage is located on a shared bus such that any node in the cluster can access any storage region, as needed for maintaining cluster file system availability. Each non-overlapped storage region contains a hierarchical filesystem containing a root and a shared folder. The folder is shared using the SMB protocol. FIG. 2 is a schematic diagram showing a cluster with shared storage.

Figure 3:
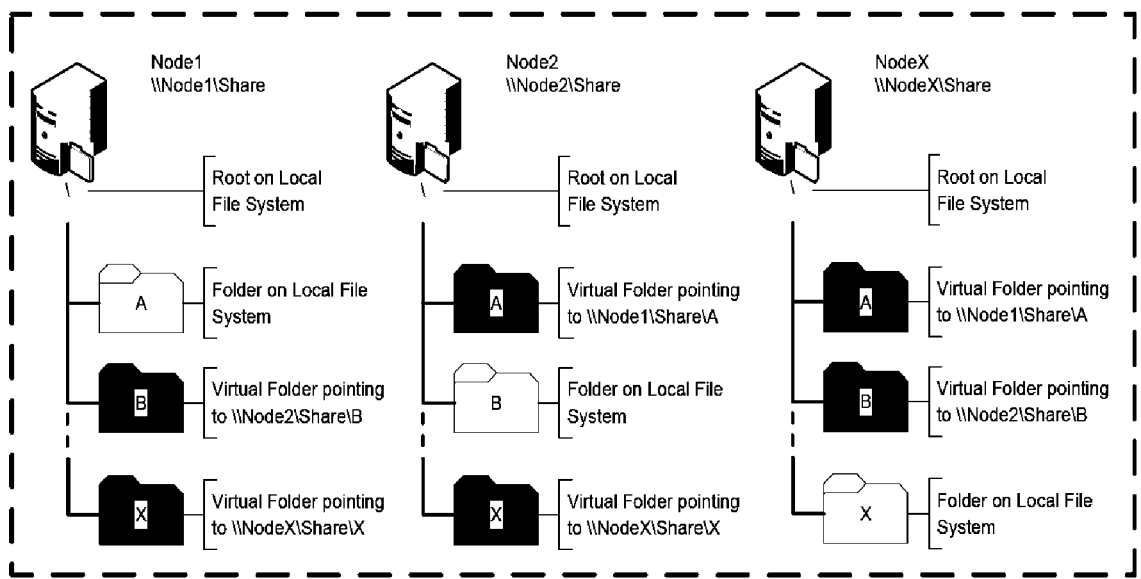
FIG. 3 is a schematic diagram showing a file virtualization based aggregated file system as known in the art.

File Virtualization is used on each cluster node to create a uniform representation of the aggregated filesystem such that each local filesystem contains a folder and file virtualization link to the filesystem of every non-overlapped storage region served by the remaining nodes. FIG. 3 is a schematic diagram showing a file virtualization based aggregated file system.

Figure 4:
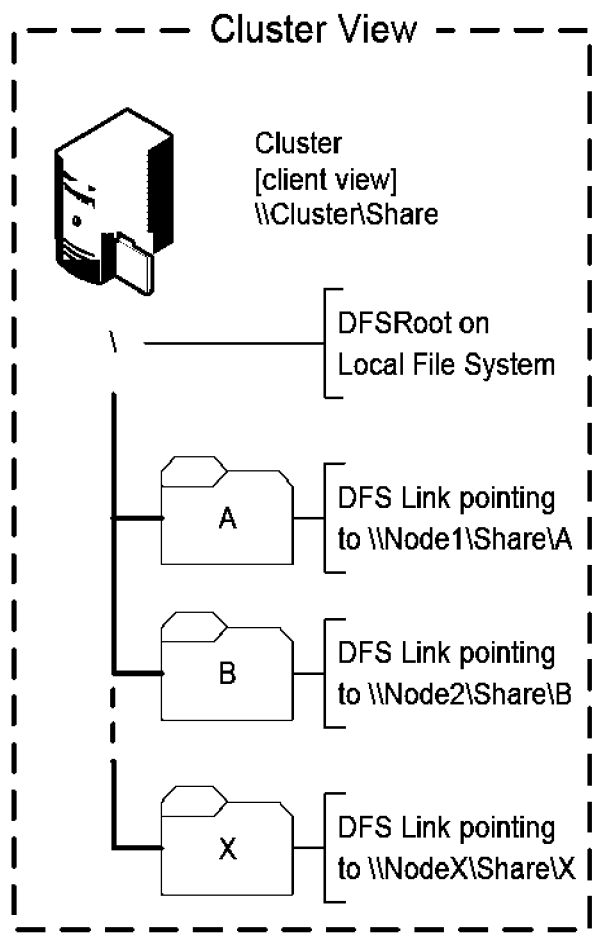
FIG. 4 is a schematic diagram showing a clustered DFS namespace as known in the art.

A DFS Namespace is created as a Cluster Resource and for every region of the non-overlapped shared storage, a DFS link is created in the DFSRoot. The DFS namespace is shared using the SMB protocol. FIG. 4 is a schematic diagram showing a clustered DFS namespace.

Figure 5:
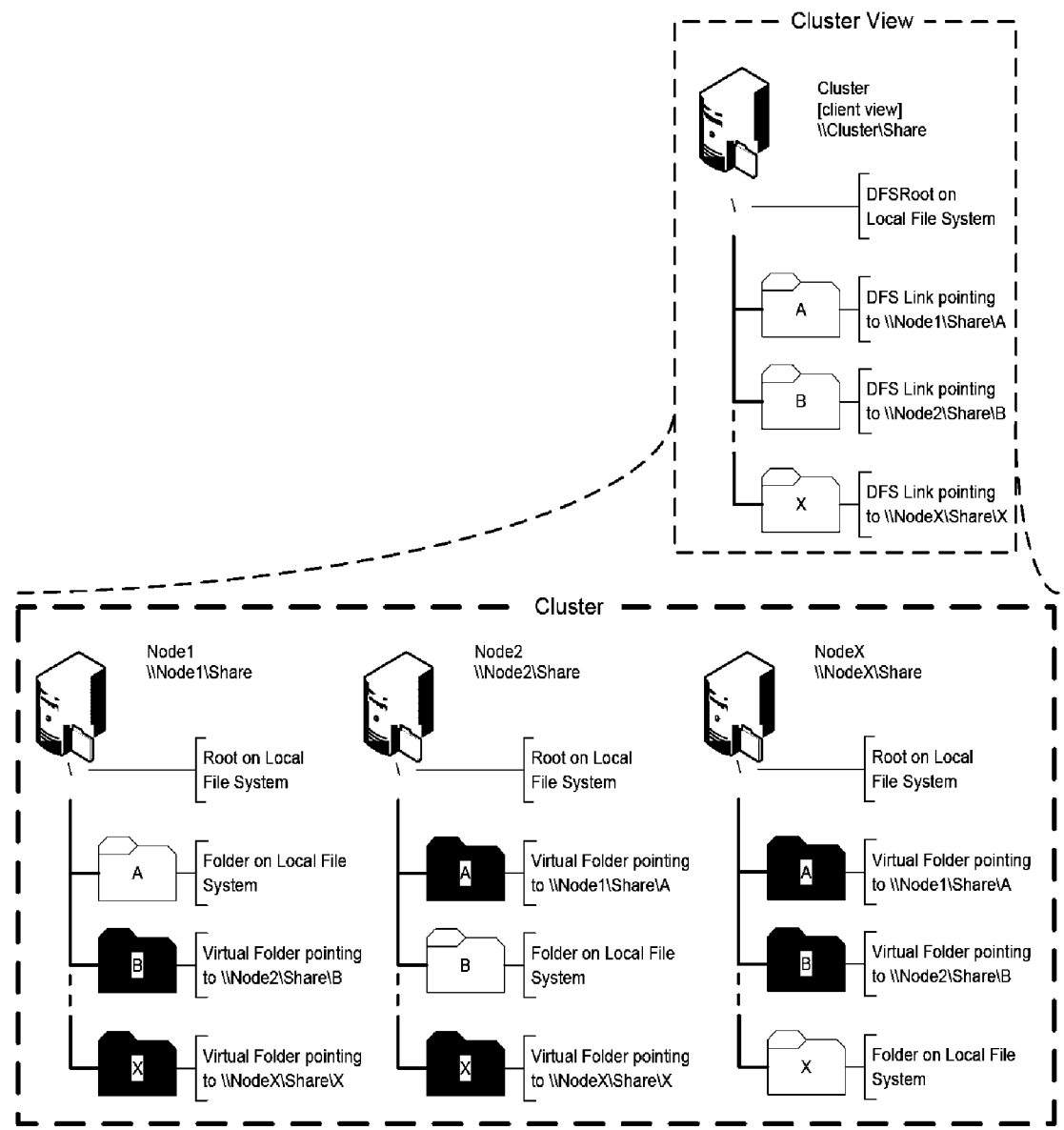
FIG. 5 is a schematic diagram showing a load sharing cluster file system in accordance with an exemplary embodiment of the present invention.

FIG. 5 is a schematic diagram showing a load sharing cluster file system in accordance with an exemplary embodiment of the present invention. Here, each file server owns one or more non-overlapping portions (e.g., folders) of the aggregated filesystem and includes file virtualization links to the folders owned by other file servers. Specifically, Node1 owns folder A and includes file virtualization links to folder B in Node2 and to folder X in NodeX, Node2 owns folder B and includes file virtualization links for folder A in Node1 and to folder X in NodeX, and Node X owns folder X and includes file virtualization links to folder A in Node1 and to folder B in Node2.

Note that each node share and the cluster share represent a uniform view of the cluster file system and that I/O can be satisfied at every entry point of the file system.

Figure 6:
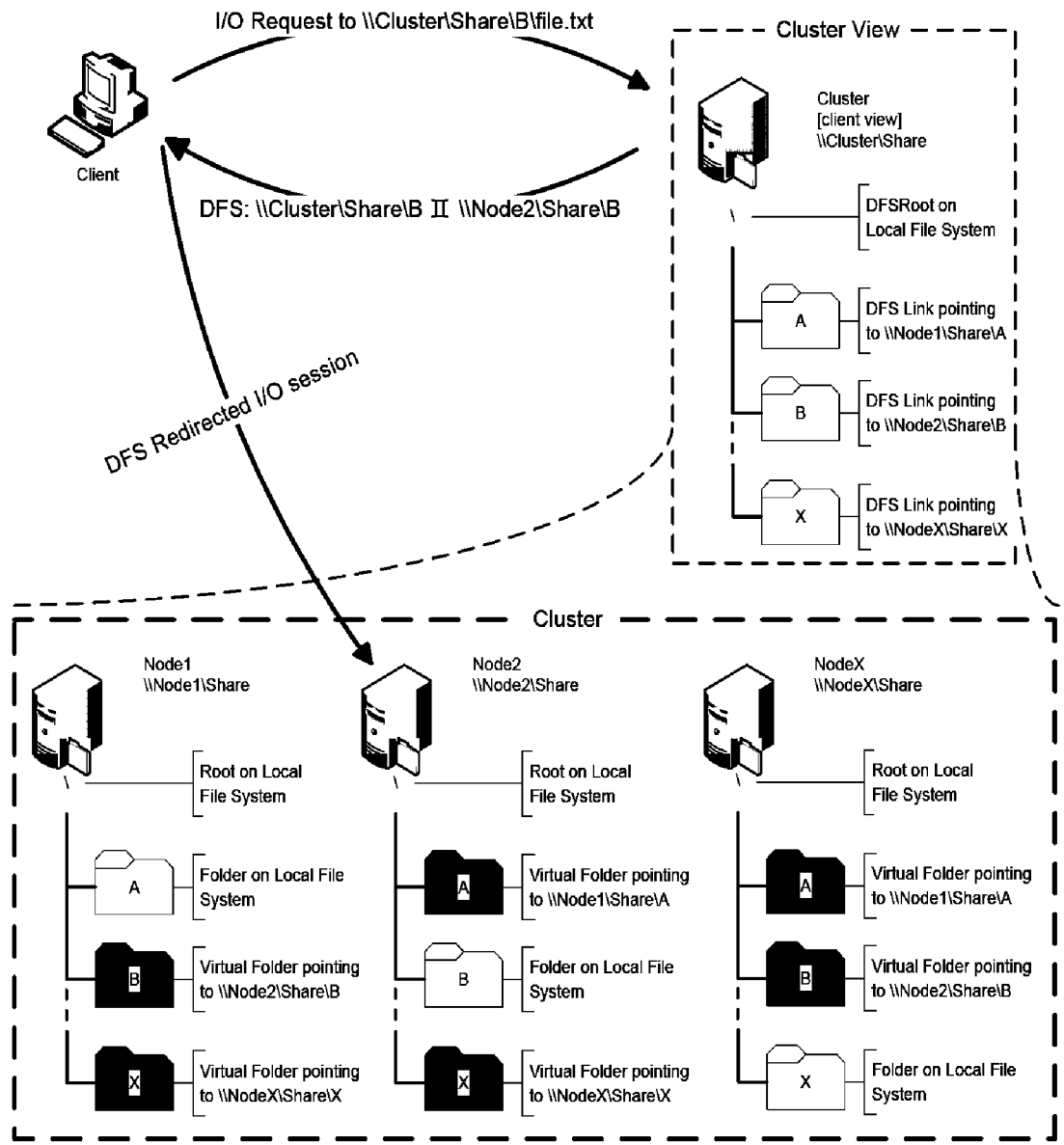
FIG. 6 is a schematic diagram showing client interaction with a load sharing cluster file system in accordance with an exemplary embodiment of the present invention.

FIG. 6 is a schematic diagram showing client interaction with a load sharing cluster file system in accordance with an exemplary embodiment of the present invention. Here, the client first sends an I/O request to the cluster resource (e.g., DFS server) including a file pathname (\\Cluster\Share\B\file.txt in this example). The cluster resource maps the file pathname to a file server that owns the file according to its own view of the aggregated filesystem (which may differ from the views maintained by one or more of the file servers for various reasons) and responds with a DFS reparse message that redirects the client to the file server selected by the cluster resource (the file pathname maps to Node2 in this example). The client updates its local MUP Cache to redirect all I/O destined for that particular pathname (i.e., \\Cluster\Share\B) to the specified location (i.e., \\Node2\Share\B) and then performs I/O directly to \\Node2\Share\B.

Figure 7:
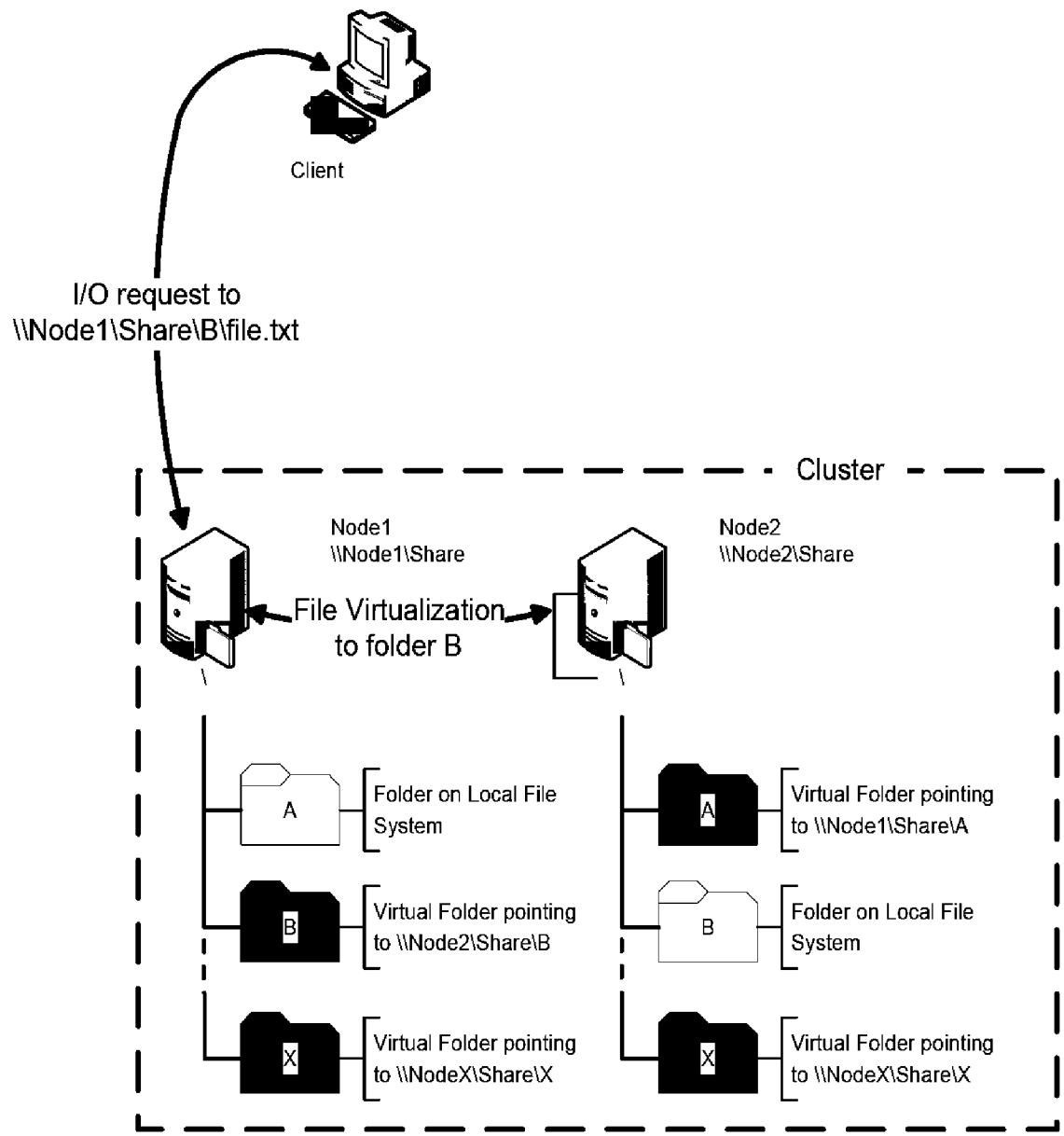
FIG. 7 is a schematic diagram showing direct client access with forwarding of the request using file virtualization, in accordance with an exemplary embodiment of the present invention.

Should the client access the cluster node directly and request I/O to a portion of the file system that is not locally owned by that node, file virtualization will proxy (i.e., forward or redirect) the I/O request to the correct cluster node based on the file virtualization links maintained by the node. FIG. 7 is a schematic diagram showing direct client access with forwarding of the request using file virtualization, in accordance with an exemplary embodiment of the present invention.

Figure 8:
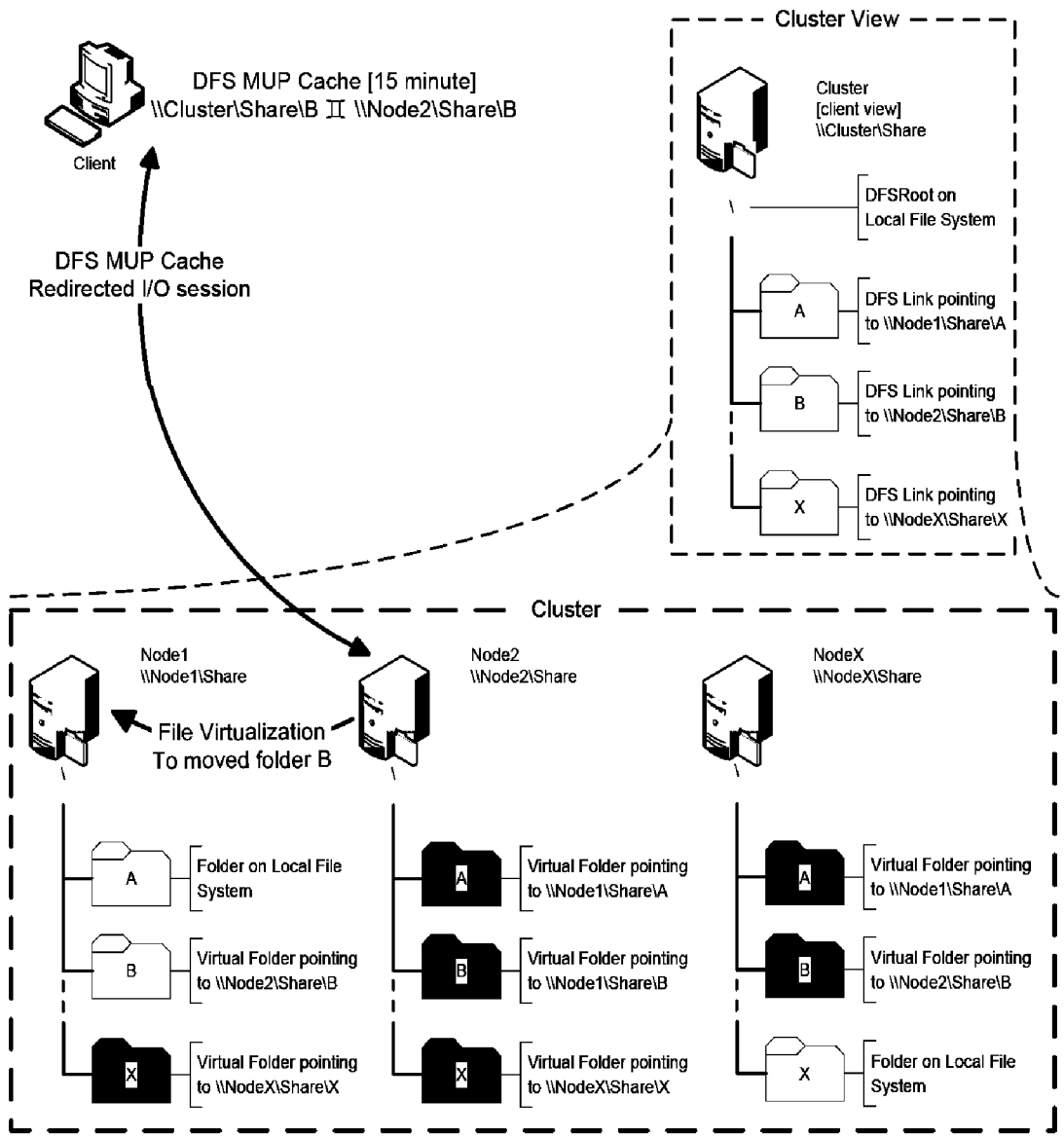
FIG. 8 is a schematic diagram showing a situation in which file virtualization is used to forward requests that are misdirected due to stale cache information, in accordance with an exemplary embodiment of the present invention.

If an administrator alters the location of the stored data and the client has stale entries in its DFS MUP Cache, file virtualization will perform the necessary I/O proxy on the server. FIG. 8 is a schematic diagram showing a situation in which file virtualization is used to forward requests that are misdirected due to stale cache information, in accordance with an exemplary embodiment of the present invention. Here, folder B has been moved to Node1 but the client continues to direct requests for the folder to Node2 based on its cached information. Node2 proxies the requests to Node1 using file virtualization.

Thus, clients consult the DFS node to identify the target file storage node that owns an unknown file object (e.g., a file object that has never been accessed before by the client). Once the file object is known to a client, the client sends file accesses to the file object directly to the identified target file storage node. The client may choose not to consult the DFS node again to identify the target node of the known file object until the client deemed it is necessary to consult the DFS node for the known file object again (e.g., when the cache entry expires). Over time, the information in the DFS node, the client caches, and/or the file storage nodes may become mismatched. As a result, a client may send a request to a file storage node (e.g., the node that the client thinks still owns the file object) that does not own the file object. Therefore, in embodiments of the present invention, the file storage nodes employ file virtualization techniques to direct misdirected file requests to the proper file storage node. It should be noted that it is possible for the view of the global namespace maintained by a particular file storage node to be incorrect and so one file storage node may misdirect the request to another file storage node that does not own the file object, but each file storage node will use file virtualization to forward the request as appropriate.

In a load sharing cluster filesystems of the type described above, each participating node of the cluster owns exclusive access to a non-overlapped portion of the shared file system namespace. If a node is experiencing a high number of client requests, it generally cannot distribute any portion of those requests to other nodes in the cluster. This may cause hotspots in the files system, where certain portions of the namespace experience high client request volume. If the high volume of requests causes the node to reach its performance limits, clients may experience degraded performance.

This hotspot problem may be mitigated, for example, by moving a portion of the aggregated filesystem from one node to another and/or by repartitioning or dividing the original namespace that experiences the hotspot problem into one or more smaller, non-overlapping sub-namespaces. Additional new nodes may be added to the cluster, or existing underutilized nodes may be designated to take over the newly created namespaces. Before the reconfiguration of the namespace is complete, the metadata and data must be migrated from the old node to the newly created or existing newly responsible nodes.

Traditionally, moving data to a new server is very time consuming and disruptive to the client. During the migration, the data to be migrated is usually taken off-line and therefore data availability is generally reduced during the migration. Also, clients of the cluster file system must know the new configuration and the new pathname to the cluster file system changes, causing difficulties for the client.

Thus, certain embodiments of the present invention use file virtualization and DFS redirection as discussed above in combination with a non-disruptive server-side data mirroring/migration technique to permit portions of the aggregated filesystem to be moved among the nodes. These embodiments generally maintain data availability during the migration, so clients in general will not be aware of the server side operations. Since the migration is performed behind the cluster, the path to the data does not change. Thus, by combining the three technologies, a load sharing cluster file system is created that supports non-disruptive configuration changes. Furthermore, the clients of this cluster are able to talk to the correct node that is destined to handle their requests, bypassing most of the need for server-side namespace switching and concurrency control, resulting in a very efficient and scalable cluster file system.

As discussed above, in a "load sharing" cluster, each cluster node is responsible for serving one or more non-overlapping portions of the cluster file system namespace. If a node receives client requests for data outside the scope of the namespace it is serving, it may forward the request to the node that does service the requested region of the namespace.

Each portion of the namespace that a node exclusively serves to clients is an actual folder in the nodes local file system. Portions of the namespace served by other nodes will appear as a virtual folder, internally identifying the file server and the full path name where the virtual folder is located via File Virtualization methods.

Figure 9:
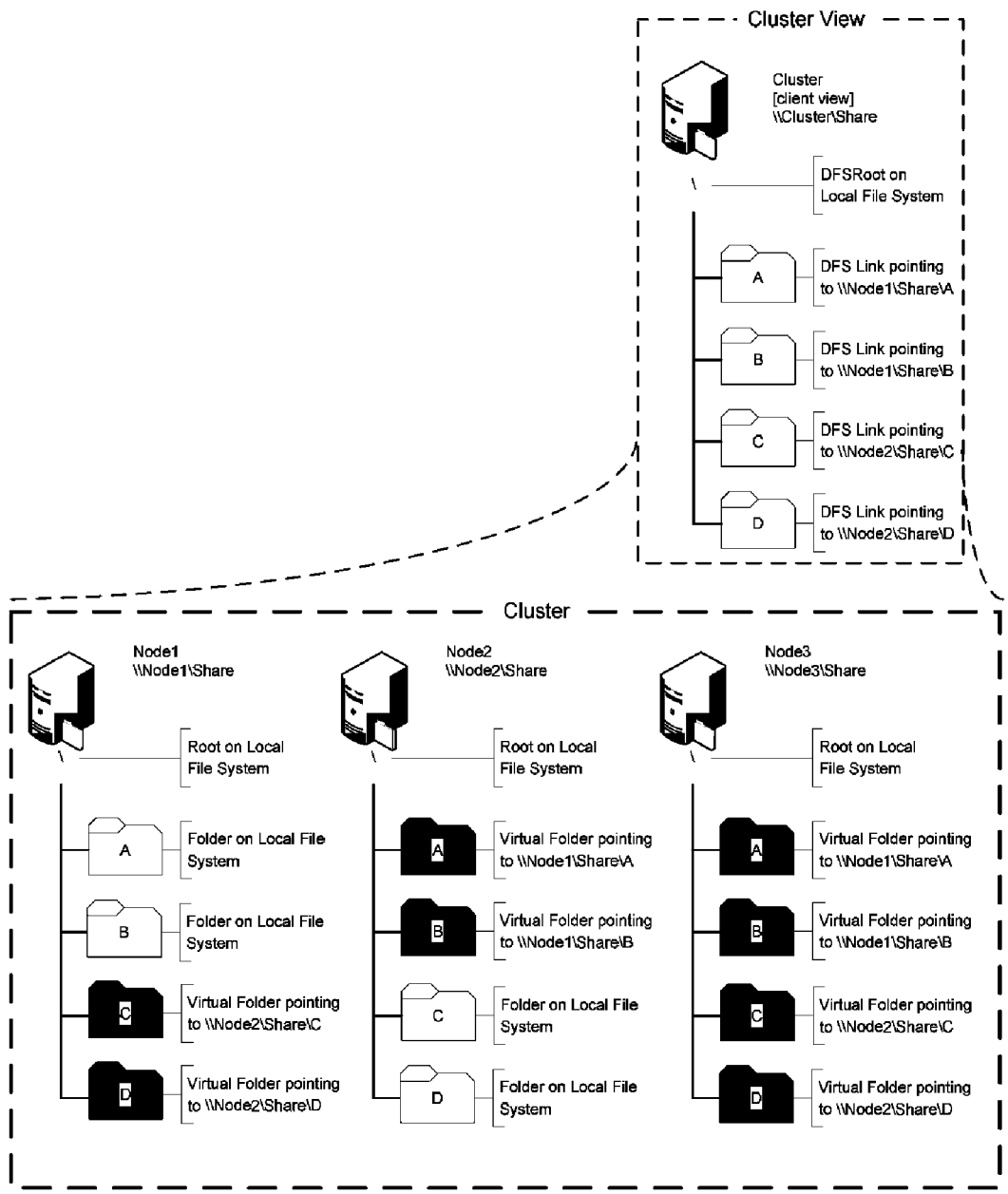
FIG. 9 is a schematic diagram showing a load sharing cluster file system in accordance with another exemplary embodiment of the present invention.

For example, in FIG. 9, node 1 is responsible for the namespace \\Cluster\Share\A, and \\Cluster\Share\B. They appear as real folders \A and \B in node 1 respectively. On the other hand, node 1 is not responsible for the namespaces \\Cluster\Share\C and \\Cluster\Share\D. These namespaces appear as virtual folders \C and \D on node 1 respectively. Normally, node 1 only receives requests targeted for \A and \B. However, if there is an inadvertent request directing at the virtual folder \C or \D, possibly because of a delay in propagating a namespace configuration changes, the request will be redirected by node 1 to the node that is responsible for \C (node 2) and \D (node 3) respectively.

Figure 10:
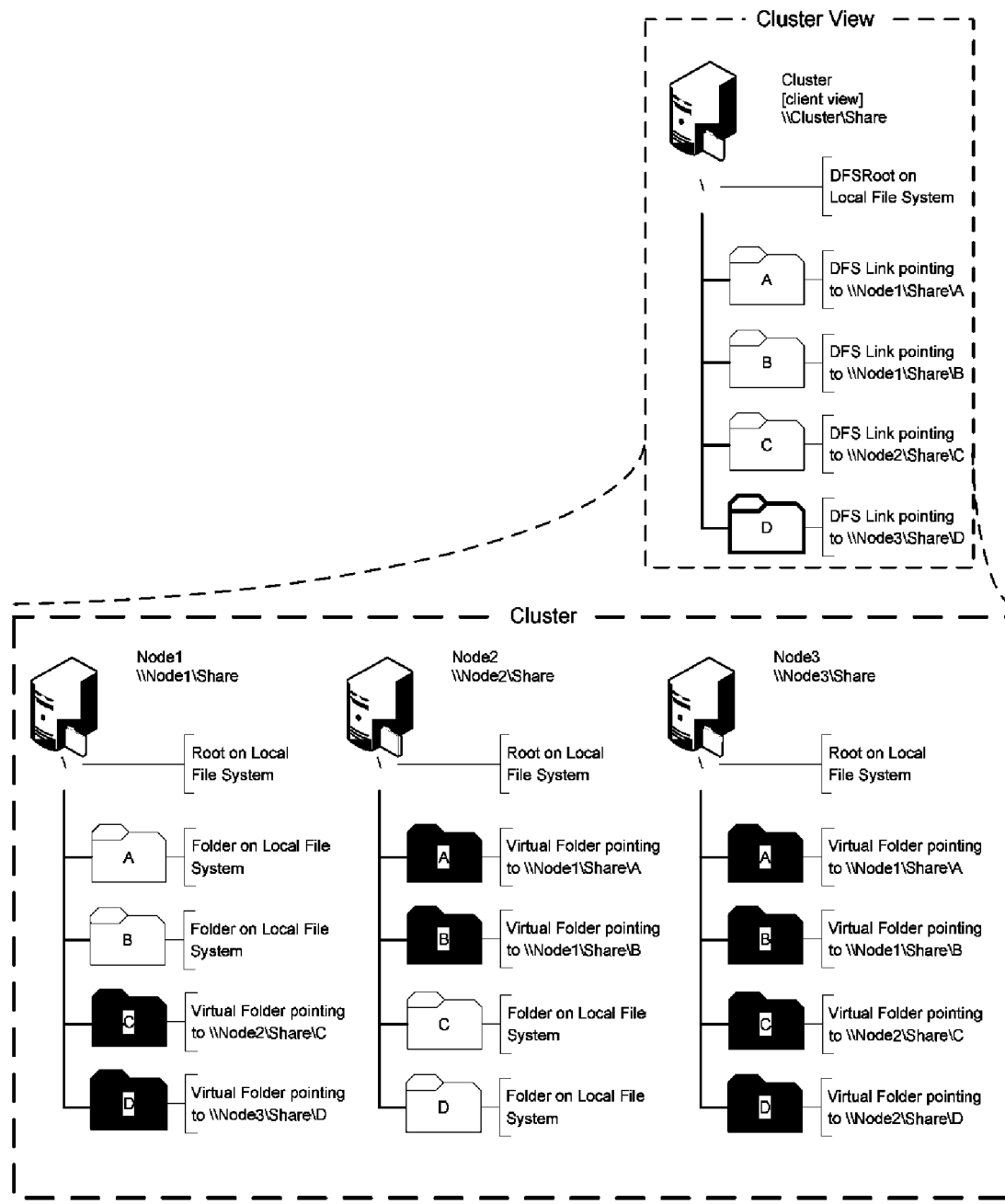
FIG. 10 is a schematic diagram showing DFS redirection to an available node in accordance with another exemplary embodiment of the present invention.

Now say, for example, the cluster namespace is to be reconfigured so that node 2 is no longer responsible for the partitioned namespace \\Cluster\Share\D. Instead, node 3 will be the node to take on the additional responsibility of managing \\Cluster\Share\D. In order for this change to be effective, the local filesystem folder D on Node2 will need to be migrated to Node3. For the time being, though, Node3 will have a file virtualization link to the folder on Node2, as shown in FIG. 10.

Figure 11:
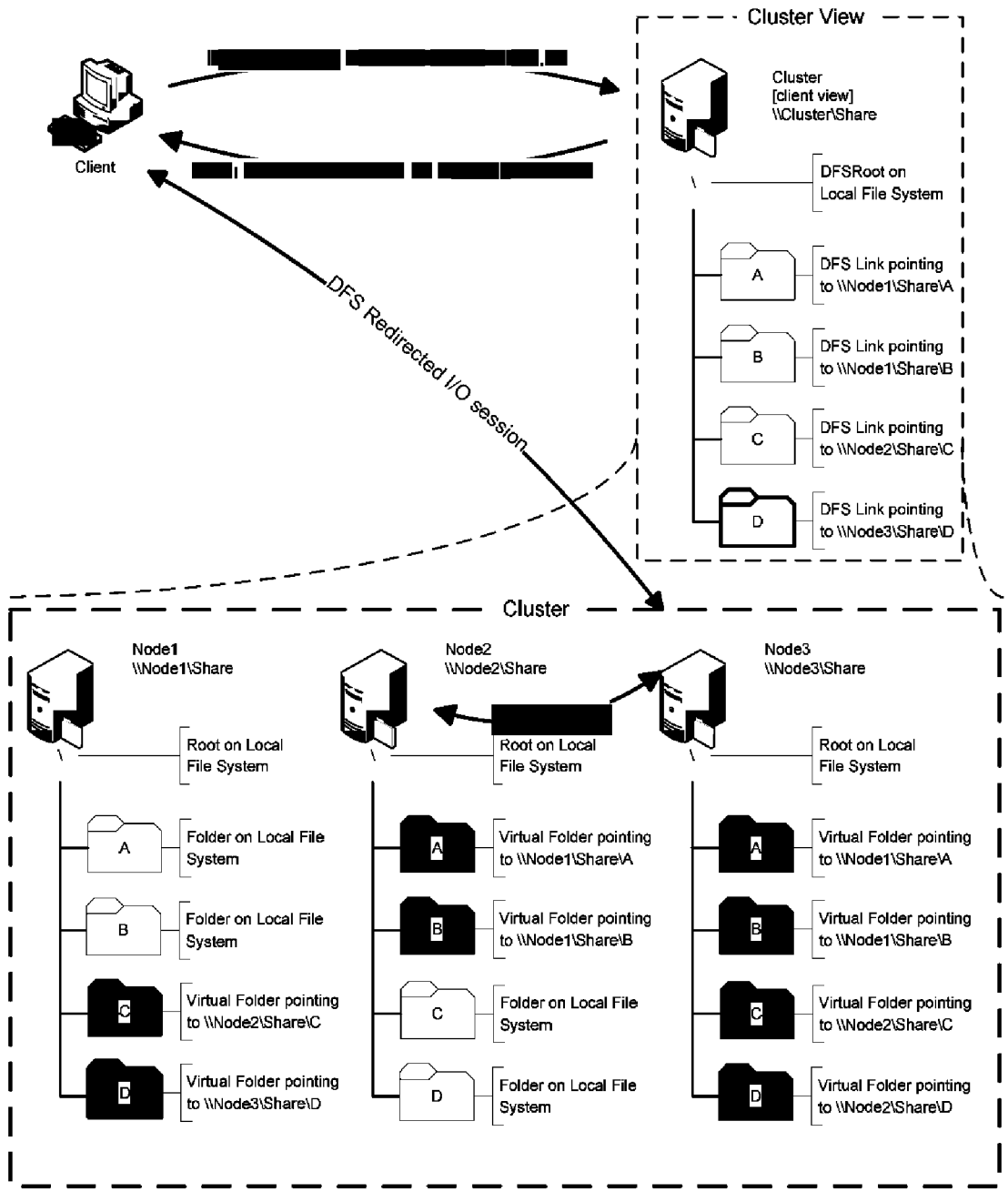
FIG. 11 is a schematic diagram showing client I/O redirection with file virtualization in accordance with another exemplary embodiment of the present invention.

In an exemplary embodiment, the first step is to use DFS to redirect client requests to the target node that will receive the migrated data. Even though Node3 will use File Virtualization to redirect the data requests to Node2, this will ensure that the namespace remains available during the migration of the data files later in the process. This is illustrated in FIG. 11.

Over time, when the client DFS cache synchronizes with the DFSRoot (typically around 15 minutes), client I/O requests will all go through Node3 and utilize the server-side file virtualization link from Node3 to Node2.

Figure 12:
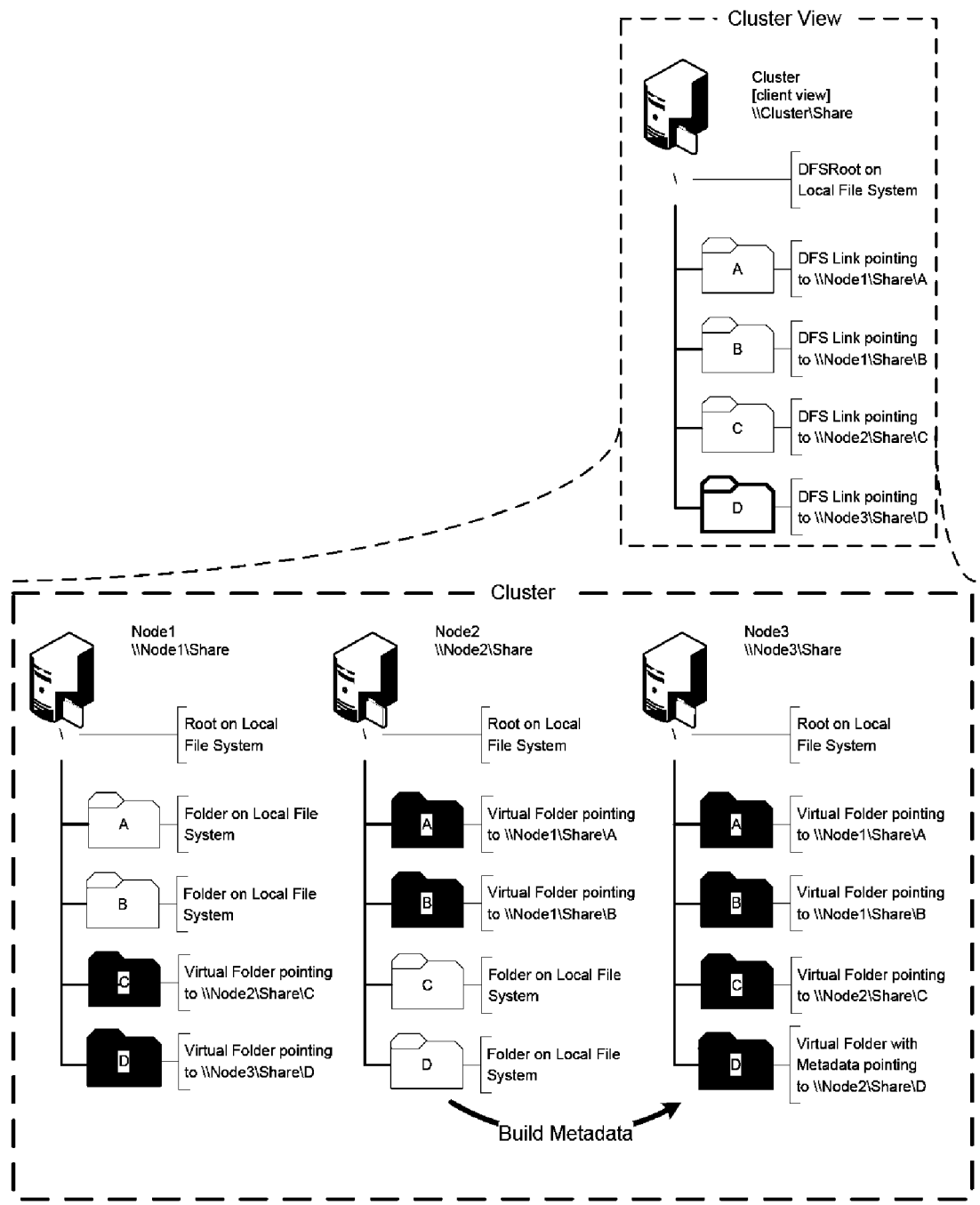
FIG. 12 is a schematic diagram showing metadata migration in accordance with another exemplary embodiment of the present invention.

The next step is to build metadata in the local file system folder on Node3 using sparse files such that all file and directory attributes of the original data in Node2 are replicated in Node3 without any of the data, as illustrated in FIG. 12. In this process, the share D on Node2 becomes a "Native with Metadata" Virtualized folder on Node3. This allows Node3 to start serving all metadata requests from the local metadata, such as locking, date and time, user authentication etc. Data requests remain proxied to Node2.

Figure 13:
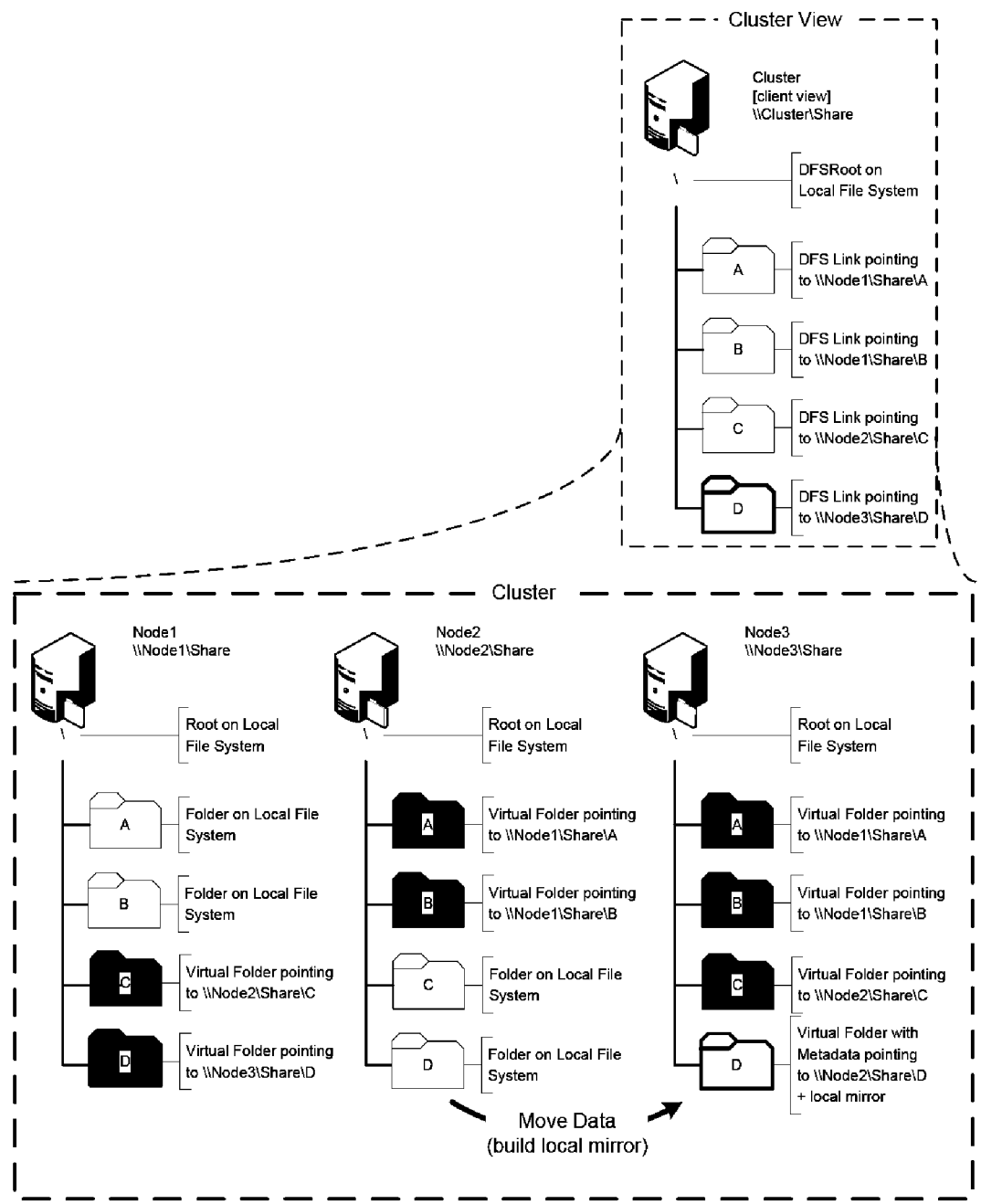
FIG. 13 is a schematic diagram showing data migration in accordance with another exemplary embodiment of the present invention.

Once the complete Metadata is created on Node3, the data can be mirrored from Node2 to Node3, as illustrated in FIG. 13.

Figure 14:
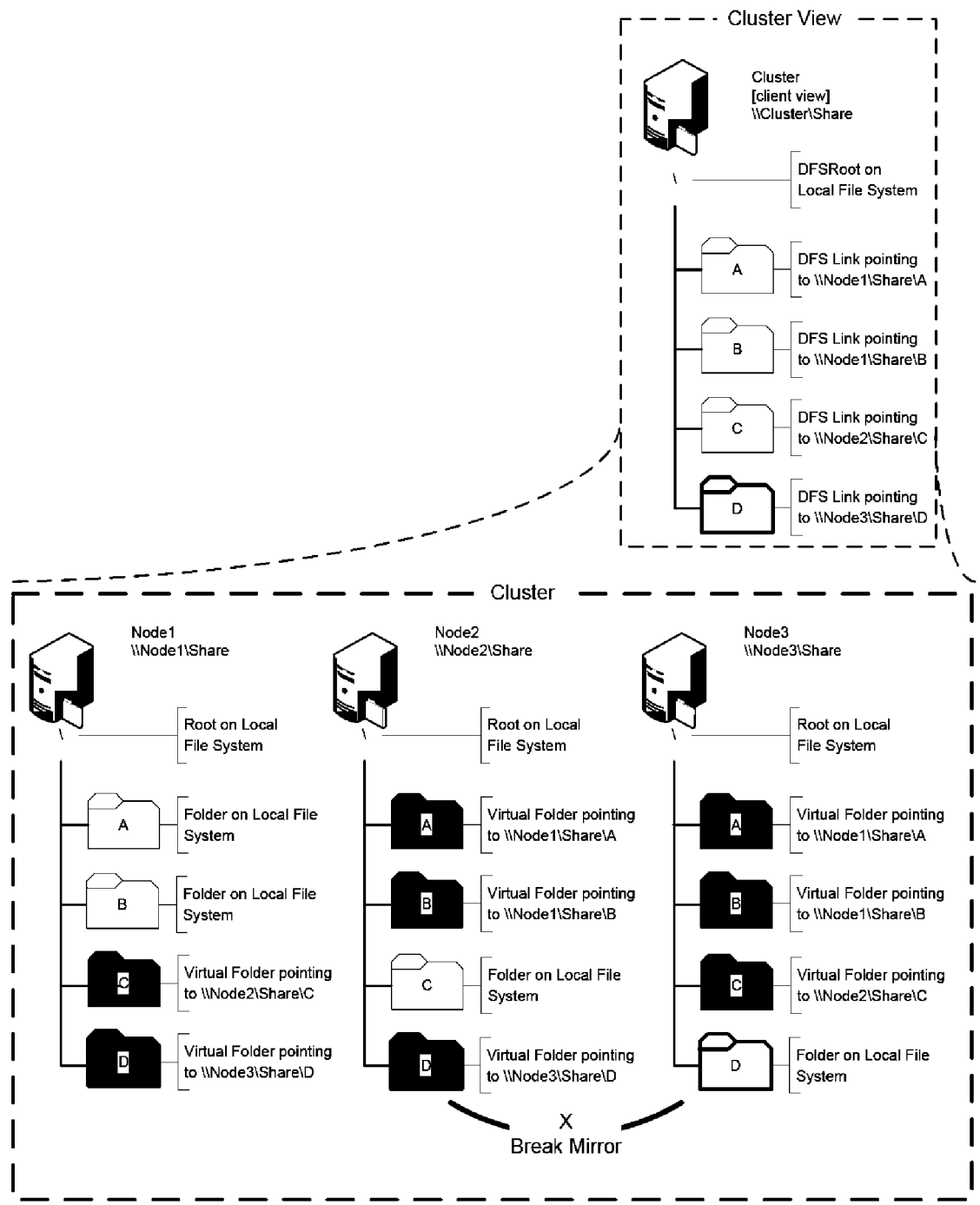
FIG. 14 is a schematic diagram showing migration completion in accordance with another exemplary embodiment of the present invention.

When Mirror is complete, the mirror between Node2 and Node3 is broken, as illustrated in FIG. 14. Migration is now complete, and the client load that was completely on Node2 is now distributed between Node2 and Node3.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method for migrating a non-overlapping portion of data from a source file storage node to a destination file storage node selected from one of an existing file storage node in a cluster of file storage nodes and a new file storage node added to the cluster, wherein each file storage node includes a file virtualization link identifying another file storage node for each of a plurality of non-overlapping portions not owned by the file storage node, the method comprising:

updating a cluster resource to map the non-overlapping portion to the destination file storage node;

establishing metadata for the non-overlapping portion on the destination file storage node;

while establishing the metadata for the non-overlapping portion, servicing client requests received for the non-overlapping portion by the source file storage node based on a file virtualization link on the destination file storage node;

after establishing the metadata for the non-overlapping portion on the destination file storage node, copying data for the non-overlapping portion from the source file storage node to the destination file storage node;

while copying, servicing metadata requests received for the non-overlapping portion by the destination file storage node using the metadata and servicing data requests for the non-overlapping portion by the source file storage node based on the file virtualization link on the destination file storage node; and after completion of the copying, designating the destination file storage node as the owner of the non-overlapping portion.

2. A method according to claim 1, wherein the non-overlapping portion is migrated due to reconfiguration of the cluster.

3. A method according to claim 1, wherein the non-overlapping portion is migrated based on loading of the source file storage node.

4. A method according to claim 1, further comprising:

breaking the file virtualization link on the destination file storage node and establishing a file virtualization link to the destination file storage node for the non-overlapping portion on the source file storage node; and after breaking the file virtualization link, servicing requests for the non-overlapping portion from the migrated metadata and data.

5. A non-transitory computer readable medium having stored thereon instructions for migrating a non-overlapping portion of data from a source file storage node to a destination file storage node selected from one of an existing file storage node in a cluster of file storage nodes and a new file storage node added to the cluster, wherein each file storage node includes a file virtualization link identifying another file storage node for each of a plurality of non-overlapping portions not owned by the file storage node, the medium comprising machine executable code which when executed by at least one processor, causes the processor to perform steps comprising:

updating a cluster resource to map the non-overlapping portion to the destination file storage node;

establishing metadata for the non-overlapping portion on the destination file storage node;

while establishing the metadata for the non-overlapping portion, servicing client requests received for the non-overlapping portion by the source file storage node based on a file virtualization link on the destination file storage node;

after establishing the metadata for the non-overlapping portion on the destination file storage node, copying data for the non-overlapping portion from the source file storage node to the destination file storage node;

while copying, servicing metadata requests received for the non-overlapping portion by the destination file storage node using the metadata and servicing data requests for the non-overlapping portion by the source file storage node based on the file virtualization link on the destination file storage node; and after completion of the copying, designating the destination file storage node as the owner of the non-overlapping portion.

6. A medium according to claim 5, wherein the non-overlapping portion is migrated due to reconfiguration of the cluster.

7. A medium according to claim 5, wherein the non-overlapping portion is migrated based on loading of the source file storage node.

8. A medium according to claim 5 further having stored thereon instructions that when executed by the at least one processor cause the processor to perform steps further comprising:

breaking the file virtualization link on the destination file storage node and establishing a file virtualization link to the destination file storage node for the non-overlapping portion on the source file storage node; and after breaking the file virtualization link, servicing requests for the non-overlapping portion from the migrated metadata and data.

9. An apparatus for migrating a non-overlapping portion of data from a source file storage node to a destination file storage node selected from one of an existing file storage node in a cluster of file storage nodes and a new file storage node added to the cluster, wherein each file storage node includes a file virtualization link identifying another file storage node for each of a plurality of non-overlapping portions not owned by the file storage node, the apparatus comprising:

a processor;

a memory coupled to the processor; and a network interface unit coupled to the processor and the memory via a bus, the network interface unit configured to implement and the processor configured to execute programmed instructions stored in the memory comprising:

updating a cluster resource to map the non-overlapping portion to the destination file storage node;

establishing metadata for the non-overlapping portion on the destination file storage node;

while establishing the metadata for the non-overlapping portion, servicing client requests received for the non-overlapping portion by the source file storage node based on a file virtualization link on the destination file storage node;

after establishing the metadata for the non-overlapping portion on the destination file storage node, copying data for the non-overlapping portion from the source file storage node to the destination file storage node;

while copying, servicing metadata requests received for the non-overlapping portion by the destination file storage node using the metadata and servicing data requests for the non-overlapping portion by the source file storage node based on the file virtualization link on the destination file storage node; and after completion of the copying, designating the destination file storage node as the owner of the non-overlapping portion.

10. An apparatus according to claim 9 wherein the non-overlapping portion is migrated due to reconfiguration of the cluster.

11. An apparatus according to claim 9 wherein the non-overlapping portion is migrated based on loading of the source file storage node.

12. An apparatus according to claim 9 wherein the processor is further configured to execute programmed instructions stored in the memory further comprising breaking the file virtualization link on the destination file storage node and establishing a file virtualization link to the destination file storage node for the non-overlapping portion on the source file storage node; and after breaking the file virtualization link, servicing requests for the non-overlapping portion from the migrated metadata and data.

13. A system for migrating a non-overlapping portion of data comprising:

a plurality of file storage nodes including at least a source file storage node and a destination file storage node, wherein the destination file storage node is selected from one of an existing file storage node in a cluster of file storage nodes and a new file storage node added to the cluster, wherein each file storage node includes a file virtualization link identifying another file storage node for each of a plurality of non-overlapping portion not owned by the file storage node; and a file virtualization apparatus comprising:

a processor;

a memory coupled to the processor; and a network interface unit coupled to the processor and the memory via a bus, the network interface unit configured to implement and the processor configured to execute programmed instructions stored in the memory comprising:

updating a cluster resource to map the non-overlapping portion to the destination file storage node;

establishing metadata for the non-overlapping portion on the destination file storage node;

while establishing the metadata for the non-overlapping portion, servicing client requests received for the non-overlapping portion by the source file storage node based on a file virtualization link on the destination file storage node;

after establishing the metadata for the non-overlapping portion on the destination file storage node, copying data for the non-overlapping portion from the source file storage node to the destination file storage node;

while copying, servicing metadata requests received for the non-overlapping portion by the destination file storage node using the metadata and servicing data requests for the non-overlapping portion by the source file storage node based on the file virtualization link on the destination file storage node; and after completion of the copying, designating the destination file storage node as the owner of the non-overlapping portion.

14. A system according to claim 13 wherein the non-overlapping portion is migrated due to reconfiguration of the cluster.

15. A system according to claim 13 wherein the non-overlapping portion is migrated based on loading of the source file storage node.

16. A system according to claim 13 wherein the processor is further configured to execute programmed instructions stored in the memory further comprising breaking the file virtualization link on the destination file storage node and establishing a file virtualization link to the destination file storage node for the non-overlapping portion on the source file storage node; and after breaking the file virtualization link, servicing requests for the non-overlapping portion from the migrated metadata and data.

* * * * *